US008369517B2

(12) United States Patent
Venelli et al.

(10) Patent No.: US 8,369,517 B2
(45) Date of Patent: Feb. 5, 2013

(54) FAST SCALAR MULTIPLICATION FOR ELLIPTIC CURVE CRYPTOSYSTEMS OVER PRIME FIELDS

(75) Inventors: Alexandre Venelli, Aix-en-Provence (FR); Francois Dassance, Aix-en-Provence (FR)

(73) Assignee: Inside Secure, Aix-en-Provence, Cedex (FR)

( * ) Notice: Subject to any disclaimer, the term of this patent is extended or adjusted under 35 U.S.C. 154(b) by 961 days.

(21) Appl. No.: 12/190,539

(22) Filed: Aug. 12, 2008

(65) Prior Publication Data

US 2010/0040225 A1 Feb. 18, 2010

(51) Int. Cl.
*H04L 1/00* (2006.01)
*H04L 9/00* (2006.01)
*H40K 9/00* (2006.01)

(52) U.S. Cl. ........................................................ 380/30

(58) Field of Classification Search ..................... 380/30
See application file for complete search history.

(56) References Cited

U.S. PATENT DOCUMENTS

| | | | | |
|---|---|---|---|---|
| 6,986,054 | B2 * | 1/2006 | Kaminaga et al. | 713/193 |
| 7,308,096 | B2 | 12/2007 | Okeya et al. | |
| 2002/0178371 | A1 * | 11/2002 | Kaminaga et al. | 713/189 |
| 2003/0123656 | A1 | 7/2003 | Izu et al. | |
| 2003/0156714 | A1 * | 8/2003 | Okeya | 380/30 |
| 2004/0247114 | A1 | 12/2004 | Joye | |
| 2007/0177721 | A1 * | 8/2007 | Itoh et al. | 380/28 |
| 2007/0291937 | A1 * | 12/2007 | Katagi et al. | 380/30 |
| 2008/0095357 | A1 * | 4/2008 | Kitamura et al. | 380/28 |
| 2009/0074178 | A1 * | 3/2009 | Longa et al. | 380/28 |

FOREIGN PATENT DOCUMENTS

| | | |
|---|---|---|
| WO | 2007/045258 | 4/2007 |

OTHER PUBLICATIONS

Nicolas Meloni; New Point Addition Formulae for ECC Applications; Springer-Verlag Berlin Heidelberg 2007; pp. 1-13.*

Byrne, et al., "SPA resistant elliptic curve cryptosystem using addition chains", 2007, Ireland, 10 pages.

Izu, et al., "Improved Elliptic Curve Multiplication Methods Resistant against Side Channel Attacks", 2002, 19 pages.

Meloni, et al., "Comparison of Simple Power Analysis Attack Resistant Algorithms for an Elliptic Curve Cryptosystem", 2007, 11 pages.

* cited by examiner

*Primary Examiner* — Philip Chea
*Assistant Examiner* — Monjour Rahim
(74) *Attorney, Agent, or Firm* — Panitch Schwarze Belisario & Nadel LLP

(57) ABSTRACT

Fast scalar multiplication operations are disclosed for use in an elliptic curve cryptographic system The operations use binary representations of a secret key and points on an elliptic curve defined over a prime field expressed in a coordinate system (e.g., Jacobian coordinates). The operations can be based on a modified Montgomery ladder that uses modified Meloni addition formulas. The operations can be more efficient than a double-and-add operation, and can be more resistant to side-channel attacks by hackers.

24 Claims, 9 Drawing Sheets

FAST SCALAR MULTIPLICATION FOR ELLIPTIC CURVE CRYPTOSYSTEMS OVER PRIME FIELDS

TECHNICAL FIELD

The subject matter of this application is generally related to elliptic curve cryptography (ECC).

BACKGROUND

ECC systems are subject to "side-channel" attacks (e.g., power analysis attacks, differential power analysis) that exploit information leaked into the operating environment of a device while the device executes cryptographic operations. For example, a hacker can monitor the power consumed or the electromagnetic radiation emitted by a device (e.g., a smart card), while it performs private-key operations such as decryption and signature generation. The hacker can also measure the time it takes to perform a cryptographic operation, or analyze how a cryptographic device behaves when certain errors are encountered. Some conventional countermeasures to side-channel attacks insert "dummy" cryptographic operations (e.g., doubling, addition), so that the operations cannot be distinguished from each other when viewed on a power trace, for example. Inserting additional "dummy" operations, however, slows down the overall cryptographic process, which can be unacceptable for certain applications.

SUMMARY

Fast scalar multiplication operations are disclosed for use in an elliptic curve cryptographic system The operations use binary representations of a secret key and points on an elliptic curve defined over a prime field expressed in a coordinate system (e.g., Jacobian coordinates). The operations can be based on a modified Montgomery ladder that uses modified Meloni addition formulas. The operations can be more efficient than a double-and-add operation, and can be more resistant to side-channel attacks by hackers.

Other implementations of fast scalar multiplication operations are disclosed, including implementations directed to systems, methods, processes, apparatuses and computer-readable mediums.

DETAILED DESCRIPTION

Example Cryptographic System & Process

Figure 1:
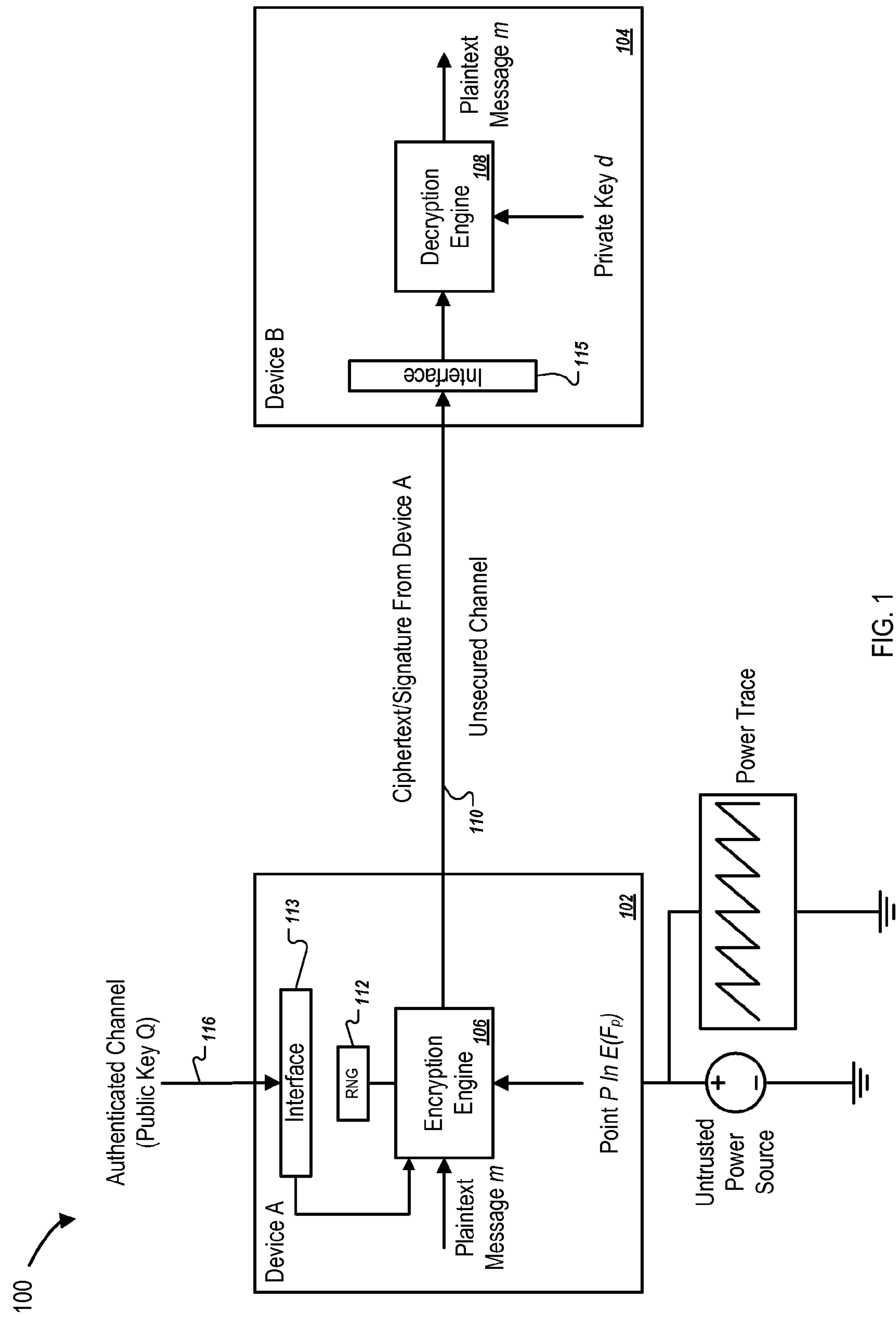
FIG. 1 is a block diagram of an example implementation of a public-key cryptographic system.

FIG. 1 is a block diagram of an example implementation of a public key cryptographic system 100. The system 100 includes device 102 ("Device A") and device 104 ("Device B"). In the example shown, device 102 can communicate with device 104 over an unsecured channel 110 and an interface 113. For example, device 102 can send a message or digital signature over the unsecured channel 110 to device 104. Devices 102 and 104 can be any device capable of performing cryptographic processes, including but not limited to: a personal computer, a mobile phone, an email device, a game console, a personal digital assistant (PDA), a media player, a storage device, etc. An unsecured channel 110 can be any communication medium, including but not limited to: radio frequency (RF) carriers, optical paths, circuit paths, networks (e.g., the Internet), etc.

In some implementations, the device 102 includes an encryption engine 106 and a random number generator 112. The random number generator can generate true random numbers (e.g., generated from a physical process) or pseudo random numbers (e.g., generated from an operation). In other implementations, interface 113 receives the random numbers through the interface 113 or the random numbers can be stored on the device 102 (e.g., in memory).

In some implementations, the device 104 includes a decryption engine 108 for decrypting ciphertext or digital signatures received from device 102 through interface 115. The devices 102 and 104 can include encryption engine 106 and decryption engine 108 for bi-directional communication. In the example shown, the device 102 and device 104 can perform a variety of cryptographic processes, including but not limited to: elliptic curve encryption/decryption, elliptic curve digital signature generation and authentication, etc. Although the cryptographic processes described herein are related to elliptic curves, the disclosed implementations can be used with any cryptographic processes that perform field operations where it is desirable to mask secret material that could be derived from analyzing the operating environment of the field operations. In some implementations, the same domain parameters (e.g., selected curve, group order, etc.) are shared by both devices 102, 104.

In some implementations, device 102 can be a smart card that is in the process of authenticating its holder to device 104, which can be a mainframe computer located at a bank, for example. A smart card, which can also be referred to as a chip card or an integrated circuit card (ICC), is a pocket-sized card (e.g., a credit card sized card) that can include embedded integrated circuits that hold and/or process information. The smart card can also include specific security logic. The stored and/or processed information can be secure information specific to its holder (e.g., a bank account number) that can be used to process a requested transaction by the user (e.g., a withdrawal from their bank account). The security logic can be used to protect the transmission of the user specific information between device 102 and device 104.

Elliptic Curve Key Generation

In some implementations, cyclic subgroups of elliptic curve groups that form an additive abelian group can be used to implement the public key cryptographic system 100 based on a discrete logarithm problem. In this implementation, an elliptic curve, E, can be defined over a finite field of integers, $F_p$. A point, P, in $E(F_p)$ can have a prime order, n. The cyclic subgroup of $E(F_p)$ generated by point P can be defined by the following equation: $\langle P\rangle=\{O, P, 2P, 3P, \ldots (n-1)P\}$, where O is the point at infinity and the identity element.

In this implementation, the prime number, p, the equation of the elliptic curve, E, (e.g., the values of a and b in equation $y^2=x^3+ax+b$ ), the point, P, and the order, n, can be the public domain parameters. A private key, d, can be a random integer selected from the interval [1, n−1], and a corresponding public key, Q, can be calculated as: Q=d.P, where point, P, is multiplied by the private key, d, an integer, using elliptic curve point multiplication, which can be denoted by the operator ".". Elliptic curve point multiplication can also be referred to as scalar multiplication or as point scalar multiplication.

For example, let A be a point on an elliptic curve. An integer, j, can be multiplied with the point A to obtain another point B on the same elliptic curve. Point multiplication can be represented by the equation: B=j.A. In some implementations, point multiplication can be performed using point addition and point doubling repeatedly to find the result. For example, if j=23, then j.A=23.A=2(2(2(2*A)+A)+A)+A, where "*" represents integer multiplication.

The problem of determining the private key, d, given the domain parameters (p, E, P, and n) and public key, Q, is referred to as the elliptic curve discrete logarithm problem (ECDLP).

ElGamal Cryptographic Processes

In some implementations, the public key cryptographic system 100 can use an elliptic curve analogue of ElGamal encryption and decryption processes. For example, a public key, Q, can be the public key of device 104, the receiving device. Device 102, the sending device, can acquire the public key, Q, from device 104 over authenticated channel 116. A plaintext message m can be represented as a point, M, in a finite field of integers $E(F_p)$. Encryption engine 106 can compute ciphertext $C_1$, where $C_1$ is a point on $E(F_p)$, using the following equation: $C_1$=k.P, where k is a random number selected by device 102 from the interval [1, (n−1)], and P is a point in $E(F_p)$ and is a domain parameter.

Encryption engine 106 can also compute ciphertext $C_2$, where $C_2$ is a point in $E(F_p)$, using the following equation: $C_2$=M+k.Q, where M is the point representation of the plaintext message m, k is a random number selected by device 102 from the interval [1, (n−1)], and Q is the point representation of the public key of device 104, where point Q is in $E(F_p)$.

The ciphertext pair of points ($C_1$, $C_2$) can be transmitted by device 102 to device 104 over unsecured channel 110. Device 104, using decryption engine 108 and its private key d, can recover the plaintext message m from the ciphertext pair of points ($C_1$, $C_2$) using the following equation: M=$C_2$−d.$C_1$, where M is the point representation of the plaintext message m, d is the private key of device 104, and plain text message m can be extracted from M.

A hacker analyzing the operating environments of the devices 102, 104 would need to compute k.Q, since d.$C_1$=k.Q. The task of computing k.Q from the domain parameters (e.g., p, E, P, n), public key Q, and $C_1$=k.P can be referred to as the elliptic curve analogue of the Diffie-Hellman problem. Since Q is a public domain parameter, the hacker need only determine the scalar k from the operating environment to recover the plaintext message m. Thus, it is desirable to protect the scalar, k, from side-channel attacks.

Coordinate Systems in Elliptic Curve Cryptography

An elliptic curve can be represented with respect to more than one coordinate system. In some implementations, points on an elliptic curve can be represented in the affine coordinate system. In some implementations, points on an elliptic curve can be represented in a projective coordinate system. In a projective coordinate system, the point (x, y, z) can be defined by x, y, z reference coordinates, where the direction of the z reference coordinate in the coordinate system can be determined by the cross product of the x and y reference coordinates.

For example, a point on an elliptic curve, P, represented by affine coordinates (e.g., x1, y1), can be converted to projective coordinates (e.g., x1, y1, z1) in a projective coordinate system. A point multiplication operation can be performed on point P, and when complete, point P can be converted back to affine coordinates.

In some implementations, Jacobian projective coordinates can represent points on an elliptic curve in a prime field (Fp). For example, the point (x, y, z) in Jacobian projective coordinates can correspond to the point ($x/z^2$, $y/z^3$) in affine coordinates. The equation of an elliptic curve on a prime field represented in Jacobian projective coordinates can be: $y^2=x^3z-3.xz^4+bz^6$.

For a point multiplication operation, the point (x, y) in affine coordinates can be converted to the point (x, y, z) in Jacobian projective coordinates. After point multiplication, the result (x, y, z) can be converted back to affine coordinates as ($x/z^2$, $y/z^3$) where z is not equal to zero. If z=0, the point can then be considered as the point at infinity, O.

Elliptic Curve Point Multiplication

As previously described, one of the main operations in elliptic curve cryptography can be point multiplication. A point multiplication operation can be performed using point addition and point doubling operations repeatedly to find the result. Each point addition and point doubling operation can include a multiplicative inverse operation. In some implementations, the inverse operation can have an execution speed orders of magnitude slower than an addition or multiplication operation. In some implementations, representing points in a projective coordinate system can eliminate the use of the multiplicative inverse operation in point addition and point doubling operations. This can result in an increase in the efficiency of the point multiplication operation.

The computational cost of point multiplication operations can be a decisive factor in the overall efficiency of elliptic curve operations in an elliptic curve cryptographic system. Securing the point multiplication operation can be a concern as the scalar, k, should be protected to avoid the recovery of the plaintext message, m. For example, a point multiplication operation, performed using point addition and point doubling operations repeatedly to find the result, depends on the value of each bit of the scalar, k. By monitoring the power consumption trace of a device (e.g., device 102) a hacker can distinguish the different functions (e.g., addition, doubling) used in the point multiplication operation. The hacker can use this information to recover the bits of the scalar, k, which can lead to the recovery of the plain text message, m.

In some implementations, an elliptic curve, E, over a field, K, can be defined by the Weierstraβ equation: E: $y^2+a_1xy+a_3y=x^3+a_2x^2+a_4x+a_6$, where $a_1,a_2,a_3,a_4$, and $a_6$ are elements of the field, K, and Δ≠0 where Δ is the discriminant of the elliptic curve, E, and is defined as follows:

$$\Delta=-d_2^2d_8-8d_4^3-27d_6^2+9d_2d_4d_6$$

$$d_2=a_1^2+4a_2$$

$$d_4=2a_4+a_1a_3$$

$$d_6=a_3^2+4a_6$$

$$d_8=a_1^2a_6+4a_2a_6-a_1a_3a_4+a_2a_3^2-a_4^2$$

In some implementations, elliptic curves can be defined over a field K, where $K=F_p$, and a finite field of elements, p, where p is greater than three. An elliptic curve, E, defined over the field, K, can then be defined by the simplified Weierstraβ equation: E/K: $y^2=x^3+ax+b$, where a and b are elements of the field, K, and satisfy the equation: $\Delta=4a^3+27b^2\neq 0 \bmod p$.

A point, P, on the elliptic curve, E, can be represented in Jacobian coordinates as P=(x,y,z), and can also be represented in affine coordinates as $(x/z^2, y/z^3)$, where z is not equal to zero. In some implementations, the point, P, represented in Jacobian coordinates can be used in a point doubling operation where P=(x,y,z), $P_3=2.P=(x_3, y_3, z_3)$ and P≠−P. In the operation, let $A=4xy^2$, $B=3x^2+az^4$, and $C=B^2-2A$. It follows that $x_3=C$, $y_3=B(A-C)-8y^4$, and $z_3=2yz$. The point doubling operation described can be performed using 3 multiplication (M) operations and 6 squaring (S) operations (also noted as (3M+6S)) in the field, K, of the elliptic curve, E.

In some implementations, the point, P, represented in Jacobian coordinates can be used in a point addition operation, where $P_1=(x_1,y_1,z_1)$, $P_2=(x_2,y_2,z_2)$, $P_1\neq\pm P_2$, $P_1$ and $P_2$ are not equal to infinity, and $P_3=P_1+P_2=(x_3,y_3,z_3)$. In the operation, let $A=x_1z_1^2$, $B=x_2Z_1^2$, $C=y_1z_2^3$, $D=y_2z_1^3$, E=B−A, and F=D−C. It follow $E^3-2AE^2$, $y_3=F(AE^2-x_3)-CE^3$, and $z_3=z_1z_2E$. The point addition operation described can be performed using 12 multiplication operations and 4 squaring operations (12 M+4S) in the field, K, of the elliptic curve, E.

An implementation of a point scalar multiplication operation for performing point multiplication operations on an elliptic curve over a prime field represented by Jacobian coordinates can have improved efficiency and increased resistance to side-channel attacks by using only point additions. The use of Jacobian coordinates can provide a good compromise between computational costs and memory usage in an elliptic curve cryptographic system. The operation can use the binary representation of the scalar, k, and Meloni's addition formula, where the input points have the same z-coordinate.

Meloni Point Addition Formulas

For example, a point scalar multiplication operation can use a simplified addition formula developed by Meloni. Meloni's addition formula can be applied to a point addition operation on two points in Jacobian coordinates, each having the same z-coordinate, where $P_1=(x_1,y_1,z)$, $P_2=(x_2,y_2,z)$, $P_1\neq\pm P_2$, $P_1$ and $P_2$ are not equal to infinity, and $P_3=P_1+P_2=(x_3,y_3,z_3)$. In the formula, let $A=(x_2-x_1)^2$, $B=x_1A$, $C=x_2A$, $C=x_2A$, and $D=(y_2-y_1)^2$. It follows that $x_3=D-B-C$, $y_3=((y_2-y_1)(B-x_3)-y_1(C-B))$, and $z_3=z(x_2-x_1)$.

The simplified point addition formula described can be performed using 5 multiplication operations and 2 squaring operations (5M+2S). This simplified point addition formula results in a point addition operation that is faster than the previously described point addition operation (12 M+4S) and the previously described point doubling operation (3M+6S). Note that in the point doubling operation, the z-coordinate of the two points added together (the same point to itself) is the same.

In some implementations, it can be unlikely that the z-coordinate of two points added together on an elliptic curve is the same. However, while computing the addition of two points, the entry point (e.g., $P_1$) can be modified such that $P_1$ and $P_3$, the result of the addition of $P_1$ and $P_2$ (e.g., $P_3=P_1+P_2$), have the same z-coordinate at the end of the addition operation. Meloni's NewAdd formula applies these rules to the addition of two points, $P_1$ and $P_2$. Using the NewAdd formula to add the point, $P_1$, to the point, $P_2$, results in the output point, $P_3=P_1+P_2=(x_3,y_3,z_3)$, and the output point $\tilde{P}_1=(x_1,y_1,z)$, which is equal to a modified version of the entry point, $P_1$, with its z-coordinate equal to the z-coordinate of point, $P_3$ (e.g., $z=z_3$). The NewAdd formula can add the points, $P_1$, and $P_2$, where $P_1=(x_1,y_1,z)$, $P_2=(x_2,y_2,z)$, $P_1\neq\pm P_2$, $P_1$ and $P_2$ are not equal to infinity, and $P_3=P_1+P_2=(x_3,y_3,z_3)$. In the formula, let $A=(x_2-x_1)^2$, $B=x_1A$, $C=x_2A$, $D=(y_2-y_1)^2$, and $E=y_1(C-B)$. It follows that the point, $P_3=P_1+P_2=(x_3,y_3,z_3)$, where $x_3=D-B-C$, $y_3=((y_2-y_1)(B-x_3)-E)$, and $z_3=Z(x_2-x_1)$. It also follows that the point $\tilde{P}_1=(x_1,y_1,z)$, where $x_1=B$, $y_1=E$, and $z=z_3$.

Meloni's concept, where an entry point can be modified such that the result of the addition of two entry points and the entry point itself have the same z-coordinate at the end of the addition operation, can also be applied to the doubling of a point. In point doubling, the entry points are the same, and the resultant point doubling produces a modified version of an entry point as well as the resultant doubling of the entry point, where both outputs have the same z-coordinate. The Meloni modified point doubling operation can be performed without increased computational cost when compared the previously described point doubling operation.

Elliptic Curve Point Scalar Multiplication Operations

In some implementations, elliptic curve point scalar multiplication (e.g., k.P) can be performed using a double-and-add operation. This operation can be the equivalent of a square-and-multiply operation for exponentiation in an elliptic curve finite field, K. For example, a double-and-add operation can perform point multiplication, Q=k.P, where the input point, P, is an element of the elliptic curve, E, the scalar, k, is of the order, n, where $k=(k_{n-1} \ldots k_1 k_0)_2$, and the output point, Q, is also an element of the elliptic curve, E. The operation to perform the point multiplication can be expressed as follows:

```
Q ← P;
for i ← n − 2 to 0 do
    Q ← 2.P;
    if k_i=1 then
        Q ← Q + P;
return Q
```

Montgomery Ladder Operation

In some implementations, a Montgomery ladder operation assumes that the sum of two points whose difference is a known point can be computed without using the y-coordinate of the two points. Montgomery's operation can be efficient on a family of elliptic curves referred to as Montgomery's curves, where a point (x, y) on an elliptic curve, defined by the equation: $by^2=x^3+ax^2+x$, can be represented as X and Z coordinates (X:Z) satisfying the equation: x=X/Z.

In some implementations, elliptic curve point scalar multiplication (e.g., k.P) can be performed using a generalized Montgomery ladder operation applied to elliptic curves defined by the simplified Weierstraβ equation: E/K: $y^2=x^3+ax+b$, as described above. For example, a generalized Montgomery ladder operation can perform point multiplication, $P_0=k.P$, where the input point, P, is an element of the elliptic curve, E, the scalar, k, is of the order, n, where $k=(k_{n-1} \ldots k_1 k_0)_2$, and the output point, $P_0$, is also an element of the elliptic curve, E. The operation to perform the point multiplication can be expressed as follows:

```
P0 ← P;
P1 ← 2.P;
for i ← n − 2 to 0 do
    Pki ← P0 + P1;
    Pki ← 2.Pki;
return P0
```

Point doubling used with Meloni's addition formula in the generalized Montgomery ladder point scalar multiplication operation can be inefficient. For example, for each bit in the scalar, k, a point doubling (e.g., $P_{ki} \leftarrow 2.P_{ki}$) would need to be computed with the same z-coordinate as the previous point addition (e.g., $P_{ki} \leftarrow P_0+P$). The benefit of the use of the simplified Meloni's addition formula in the point multiplication would be lost. In some implementations, a Fibronacci-and-add operation can be used to perform point scalar multiplication using the Meloni addition formula. The scalar, k, is represented by a Fibronacci number. The Fibonacci numbers are a sequence of numbers. The first number of the sequence is 0, the second number is 1, and each subsequent number is equal to the sum of the previous two numbers of the sequence itself. The benefit of the use of the simplified Meloni's addition is counteracted by the representation of the scalar, k, which, as a Fibronacci number, is larger than its binary representation.

Montgomery Ladder With Additions Operation

A faster point scalar multiplication operation can use a modified version of the generalized Montgomery ladder with Meloni's NewAdd addition formula. The operation can be used for multiplication of an elliptic curve point, P, with an integer, k, where R, an n-bit integer, is the order of the elliptic curve point, P, and $k<R-1$. The faster point scalar multiplication operation can be resistant to simple power analysis (SPA) attacks, and fault analysis (FA) attacks.

For example, a Montgomery ladder with additions operation can perform point multiplication, $P_2=k.P$, where the input point, P, is an element of the elliptic curve, E, the scalar, k, is of the order, n, where $k=(k_{n-1} \ldots k_1 k_0)_2$, and the output point, $P_2$, is also an element of the elliptic curve, E. The operation to perform the point multiplication is as follows:

```
P1 ← P;
P2 ← 2.P;
for i ← n − 2 to 0 do
    P1 ← P1 + P2;
    if ki = 0 then
        P' ← −P;
    else
        P' ← P;
    P2 ← P1 + P';
return P2,
```

where the operations included within the "for" loop can be referred to as a "round" within the operation. The operation includes the execution of a number of rounds, where the number of rounds is based on the value of the order, n.

In order to use Meloni's addition in the Montgomery ladder with additions operation, the z-coordinates of the two points added together should be equal. In addition, the z-coordinates of $P_1$ and $P_2$ should be equal (e.g., $z_{P1}=z_{P2}$) at the end of each round in order to add the two points in the next round. This is a property of the NewAdd operation. Also, the point, P', where $P'=\pm P$, should have the same z-coordinate as the point, $P_1$, before computing $P_2 \leftarrow P_1+P'$.

In some implementations, an updated value of the point, P, can be calculated at each round in the Montgomery ladder with additions operation in order to satisfy the requirement of $z_P=z_{P1}$. This can include the following steps: (1) storing the point, P=(x,y,z), for the entire point scalar multiplication operation; (2) calculating, at each round, if P=(x,y,z) and $P_1=(x_1,y_1,z_1)$, the value, $\lambda=z_1 z^{-1}$, where $z^{-1}$, is the modular inversion of z; and (3) determining $P'=\pm(\lambda x, \lambda y, \lambda z)$. The Montgomery ladder with additions operation can perform the point scalar multiplication, k.P, where k is an n-bit scalar using the total number of operations, $$n(2(5M+2S)+4M+S+I)=n(14M+5S+I).$$

In some implementations, the modular inversion of z, $z^{-1}$, can be performed at the beginning of the Montgomery ladder with additions operation (before the "for" loop) and stored in another variable. This eliminates the calculation of the modular inversion of z in each round. In some implementations, if the input point, P, is expressed in affine coordinates, where z=1, z does not need to be inverted.

Modified NewAdd Addition Formula: NewAddSub Operation

In some implementations, the Montgomery ladder with additions operation can be modified to recompute the point, P, at each round with an appropriate z-coordinate. Meloni's NewAdd operation modifies the entry point, $P_1$, for the Meloni addition operation so that the point, $P_1$, and the resulting point, $P_3=P_1+P_2$, have the same z-coordinate at the end of the point addition. The NewAdd operation can be further modified to recomputed the point, $P_1$, (resulting in the point $\tilde{P}_1$) to have the same z-coordinate as the sum of the two points $P_1$ and $P_2$, and the difference of the two points $P_1$ and $P_2$ (e.g., $z_{\tilde{P}_1}=z_{P_1+P_2}=z_{P_1-P_2}$). The resulting NewAddSub operation can be used in place of the NewAdd operation in the Montgomery ladder with additions operation. The NewAddSub operation can take two points, $P_1=(x_1, y_1, z)$ and $P_2=(x_2, y_2, z)$, where both points have the same z-coordinate, and produce the output points $\tilde{P}_1$, $P_1+P_2$, and $P_1-P_2$, where all three output points have the same z-coordinate.

The NewAddSub operation is disclosed in APPENDIX A. The NewAddSub operation uses the NewAdd operation and adds subtraction at the additional cost of 1 multiply operation and 1 square operation (1M+1S). The NewAddSub operation uses, in total, 6 multiply operations and 3 square operations (6M+3S) as compared to the NewAdd operation which uses 5 multiply and 2 square operations (5M+2S).

FullMult Point Scalar Multiplication Operation

A FullMult point scalar multiplication operation can be written that uses the NewAddSub operation. The FullMult point scalar multiplication operation can perform point multiplication, B=k.P, where the input point, P, is an element of the elliptic curve, E, the scalar, k, is of the order, n, where $k=(k_{n-1} \ldots k_1 k_0)_2$, and the output point, B, is also an element of the elliptic curve, E.

The FullMult operation is disclosed in APPENDIX A. The FullMult operation uses the NewAddSub operation and, for a n-bit scalar, k, the complexity of the FullMult operation is n(12M+6S).

Modified FullMult Point Scalar Multiplication Operation

Upon further examination of the FullMult operation, it can be noted that the NewAddSub operations in the if . . . else section of the "for" loop can be replaced by NewAdd operations. This is because point subtraction is not needed for the point operations within the if . . . else section of the "for" loop. In some implementations, the two occurrences of the NewAddSub operation in the if . . . else section of the "for" loop can be directly replaced by two occurrences of the NewAdd operation as long as the system implementing the operations can accommodate the storage requirements needed for both operations. The modified FullMult point scalar multiplication operation can use both the NewAdd and the NewAddSub operations. The modified FullMult point scalar multiplication operation can perform point multiplication, B=k.P, where the input point, P, is an element of the elliptic curve, E, the scalar, k, is of the order, n, where $k=(k_{n-1} \ldots k_1 k_0)_2$, and the output point, B, is also an element of the elliptic curve, E.

The modified FullMult operation to perform the point multiplication is described in APPENDIX A. The modified FullMult operation uses both the NewAddSub and the NewAdd operations and, for a n-bit scalar, k, the complexity of the modified FullMult operation is n(NewAddSub+NewAdd)=n((6M+3S)+(5M+2S))=n(11M+5S). The modified FullMult operation uses n(1M+1S) fewer operations than the FullMult operation.

LightMult Point Scalar Multiplication Operation

Upon further examination of the "for" loop in the FullMult point scalar multiplication operation, and the "for" loop in the modified FullMult point scalar multiplication operation, it can be noted that the z-coordinate of the points A and B is not used in either the NewAddSub operation or the NewAdd operation for computing either the x or y coordinates of points A or B. The FullMult point scalar multiplication operation can be modified to produce a LightMult point scalar multiplication operation, where the z-coordinate can be computed outside of the "for" loop during the last round of the "for" loop. This can result in reducing the overall computational cost of the point scalar multiplication operation.

In some implementations, the NewAddSub formula can be further modified to recomputed the point, $P_1$, (resulting in the point $\tilde{P}_1$) to have the same z-coordinate as the sum of the two points $P_1$ and $P_2$, and the difference of the two points $P_1$ and $P_2$ (e.g., $z_{\tilde{P}_1}=z_{P_1+P_2}=z_{P_1-P_2}$), where the final z-coordinate is not computed in the NewAddSub operation. Instead, the point scalar multiplication operation can compute the final z-coordinate once. The resulting LightAddSub operation can be used in place of the NewAddSub operation in the FullMult point scalar multiplication operation, resulting in a LightMult point scalar multiplication operation. The LightMult operation can compute the final z-coordinate once during the last round of the operation. The LightAddSub operation can take two points, $P_1=(x_1, y_1, z)$ and $P_2=(x_2, y_2, z)$, where both points have the same z-coordinate, and produce the output points $\tilde{P}_1$, $P_1+P_2$, and $P_1-P_2$, where all three output points have the same z-coordinate. However, the LightAddSub operation does not compute the z-coordinate as it is not needed by the LightMult operation.

The LightAddSub is disclosed in APPENDIX A. The LightAddSub operation uses 5 multiply operations and 3 square operations (5M+3S) as compared to the NewAddSub operation, which uses 6 multiply, and 3 square operations (6M+3S). The LightAddSub uses one less multiplication operation than the NewAddSub as the z-coordinate is no longer calculated.

In order to use the LightAddSub operation, the FullMult point scalar multiplication operation can be modified to compute the last round of the loop on k separately in order to calculate the final z-coordinate. The resulting LightMult point scalar multiplication operation can perform point multiplication, B=k.P, where the input point, P, is an element of the elliptic curve, E, the scalar, k, is of the order, n, where $k=(k_{n-1} \ldots k_1 k_0)_2$, and the output point, B, is also an element of the elliptic curve, E.

The LightMult operation is disclosed in APPENDIX A. The LightMult operation uses the LightAddSub operation exclusively and, for a n-bit scalar, k, the complexity of the LightMult operation is n(10M+6S). This can be compared to the complexity of the FullMult operation, n(12M+6S) and the modified FullMult operation, n(11M+5S).

Modified LightMult Point Scalar Multiplication Operation

Upon further examination of the LightMult operation, it can be noted that the LightAddSub operations in the if . . . else section of the "for" loop and the if . . . else section that computes the final value of the z-coordinate can be replaced by LightAdd operations. A LightAdd operation can be a modified NewAdd operation that does not compute the z-coordinate. This can be done because point operations within the if . . . else sections do not need to perform point subtraction and they do not need to compute the z-coordinate. Using the LightAdd operation to add the point, $P_1$, to the point, $P_2$, results in the output point, $P_3=P_1+P_2=(x_3,y_3)$, where the z-coordinate is calculated separately within the LightMult operation. An additional result is the output point $\tilde{P}_1$, which is equal to a modified version of the entry point, $P_1$, with its z-coordinate equal to the z-coordinate of point, $P_3$, however not calculated until the final round of the point addition in the LightMult operation. The LightAdd formula can add the points, $P_1$, and $P_2$, where $P_1=(x_1,y_1,z)$, $P_2=(x_2,y_2,z)$, $P_1 \neq \pm P_2$, $P_1$ and $P_2$ are not equal to infinity, and $P_3=P_1+P_2=(x_3,y_3,z_3)$. In the formula, let $A=(x_2-x_1)^2$, $B=x_1A$, $C=x_2A$, $D=(y_2-y_1)^2$, and $E=y_1(C-B)$. It follows that the point, $P_3=P_1+P_2=(x_3,y_3,z_3)$, where $x_3=D-B-C$, and $y_3=((y_2-y_1)(B-x_3)-E)$, and $z_3$ is not calculated. It also follows that the point $\tilde{P}_1=(x_1,y_1,z)$, where $x_1=B$, $y_1=E$, and z is also not calculated.

The LightAdd operation uses 4 multiply operations and 2 square operations (4M+2S) as compared to the LightAddSub operation, which uses 5 multiply operations and 3 square operations (5M+3S).

In some implementations, the occurrences of the LightAddSub operations in the if . . . else sections can be directly replaced by occurrences of the LightAdd operation as long as the system implementing the operations can accommodate the storage requirements needed for both operations. The modified LightMult point scalar multiplication operation can use both the LightAdd and the LightAddSub operations. The modified LightMult point scalar multiplication operation can perform point multiplication, B=k.P, where the input point, P, is an element of the elliptic curve, E, the scalar, k, is of the order, n, where $k=(k_{n-1} \ldots k_1 k_0)_2$, and the output point, B, is also an element of the elliptic curve, E.

The modified LightMult operation to perform the point multiplication is disclosed in APPENDIX A. The modified LightMult operation uses both the LightAddSub and the LightAdd operation. For a n-bit scalar, k, the complexity of the modified LightMult operation is n(LightAddSub+LightAdd)=n((5M+3S)+(4M+2S))=n(9M+5S). This can be compared to the complexity of the LightMult operation, n(10M+6S), the FullMult operation, n(12M+6S), and the modified FullMult operation, n(11M+5S).

The complexity of the FullMult, modified FullMult, LightMult, and modified LightMult point scalar multiplication operations can be compared to other operations, such as a generic Montgomery ladder operation, a modified Montgomery ladder operation presented by Izu and Takagi, and a Meloni proposed Fibonacci-and-add operation. Table 1 illustrates the complexity of one round of each operation.

| Algorithm | Complexity (per bit of scalar) |
|---|---|
| Generic Montgomery ladder | 15M + 5S |
| Modified Montgomery ladder by Izu-Takagi | 13M + 4S |
| Fibonacci-and-add | 14M + 5S |
| FullMult | 12M + 6S |
| Modified FullMult | 11M + 5S |
| LightMult | 10M + 6S |
| Modified LightMult | 9M + 5S |

Resistance Against Side-Channel Attacks

Elliptic curve cryptographic systems can be subject to side-channel attacks, which can be a concern in smart card implementations. In order to protect the FullMult, modified FullMult, LightMult, and modified LightMult point scalar multiplication operations from side-channel attacks, the operations keep the structure of a protected operation, the Montgomery ladder, and improve upon it by using faster and fewer operations.

Power analysis attacks (e.g., simple power analysis (SPA), differential power analysis (DPA)) can be effective in elliptic curve cryptographic systems. For example, a differential power analysis can attack an operation by storing the power consumption traces of multiple monitored runs of the operation. The differential power analysis can use a statistical tool to retrieve the secret information from the monitored operation.

For example, a simple power analysis can attack an operation by storing the power consumption trace of a single monitored run of the operation. Since elliptic curve additions and doublings can use different operations, one can observe in the power consumption traces of the two operations which trace corresponds to an addition operation and which trace corresponds to a doubling operation. When using a double-and-add operation, which includes point addition and point doubling, for point scalar multiplication (e.g., k.P), the execution of a point addition operation depends on a bit of the scalar, k, which can be considered a secret key. With one trace of the double-and-add operation, a hacker can retrieve the values of the bits of the scalar, k. In the FullMult, modified FullMult, LightMult, and modified LightMult point scalar multiplication operations, each round of the "for" loop in the Montgomery ladder with additions operation executes the same operations independent of the value of the bit of the scalar, k, protecting it.

Another type of side-channel attack can be a fault analysis. For example, a fault analysis can provide information to a hacker when an error occurs during the execution of a point scalar multiplication operation. In the FullMult, modified FullMult, LightMult, and modified LightMult point scalar multiplication operations, the Montgomery ladder with additions operation can be resistant against these attacks as no dummy operations are inserted in the operations and every value computed within the "for" loop is then reused.

Elliptic Curve Encryption Process

Figure 2:
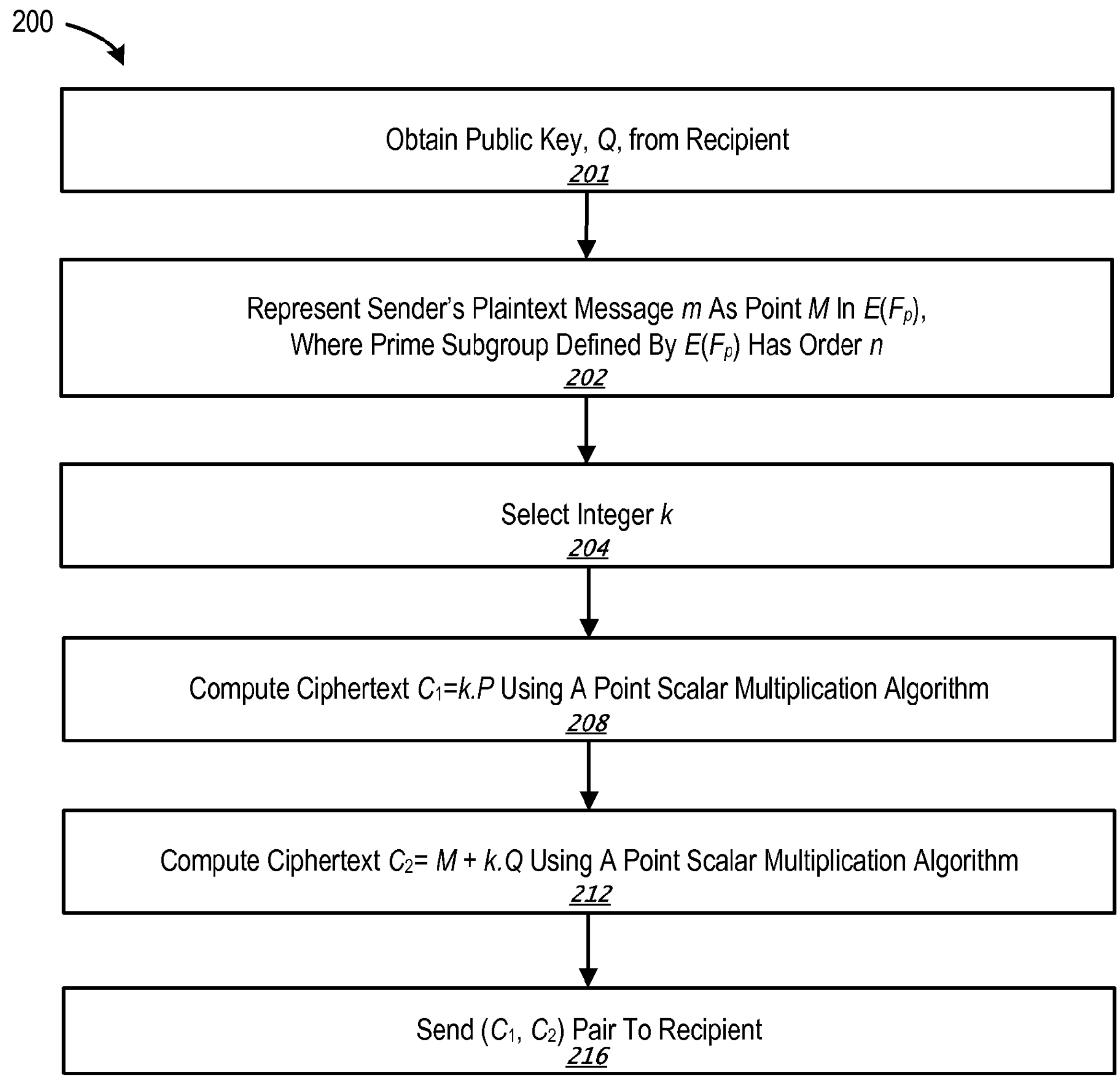
FIG. 2 is a flow diagram of an example implementation of an elliptic curve ElGamal encryption process.

FIG. 2 is a flow diagram of an example implementation of an elliptic curve ElGamal encryption process 200. The process 200 can be performed on elliptic curves on a prime field ($F_p$) represented by Jacobian coordinates. The process 200 can utilize any of the faster scalar point multiplication operations previously described (e.g., the FullMult, modified FullMult, LightMult, and modified LightMult point scalar multiplication operations).

The process 200 begins with a sender obtaining a public key, Q, from a recipient over an authenticated channel between the sender and the recipient (step 201). The sender can represent its plaintext message m as a point M on an elliptic curve, E, which can be defined over a finite prime field, $F_p$, for example, where p is a prime number. The set of all points on the elliptic curve E can be denoted as $E(F_p)$, which defines a prime subgroup of order n (step 202). The sender can then select a random number k from the interval [1, (n−2)], where n is the prime order of the group containing the point P (step 204).

The sender can compute ciphertext point $C_1$ (step 208) using the equation $C_1$=k.P, where k is a scalar and P is a point on the elliptic curve, E. The scalar point multiplication can be performed by using a FullMult point scalar multiplication operation, a modified FullMult point scalar multiplication operation, a LightMult point scalar multiplication operation, or a modified LightMult point scalar multiplication operation.

The sender can compute ciphertext point $C_2$ (step 212) using the equation $C_2$=M+k.Q, where M is the point representation of the plaintext message m, k is a scalar, and Q is the point representation of the public key of the recipient. The scalar point multiplication can be performed by using a FullMult point scalar multiplication operation, a modified FullMult point scalar multiplication operation, a LightMult point scalar multiplication operation, or a modified LightMult point scalar multiplication operation.

The sender can transmit the ciphertext pair of points ($C_1$, $C_2$) to the recipient (step 216) over an unsecured channel between the sender and the recipient. The process 200 ends.

A recipient can recover the plain text message m. The plaintext message m is first represented as a point M, and then encrypted by adding it to k.Q, where k is a randomly selected integer, and Q is the intended recipient's public key. The sender transmits the points $C_1$=k.P and $C_2$=M+k.Q to the recipient who uses its private key d to compute d.$C_1$=d(k.P)=k(d.P)=k.Q, and thereafter recovers M=$C_2$−kQ. An eavesdropper who wishes to recover M needs to compute k.Q. This task of computing k.Q from the domain parameters, Q, and $C_1$=k.P, is the elliptic curve analogue of the Diffie-Hellman problem.

Figure 3A:
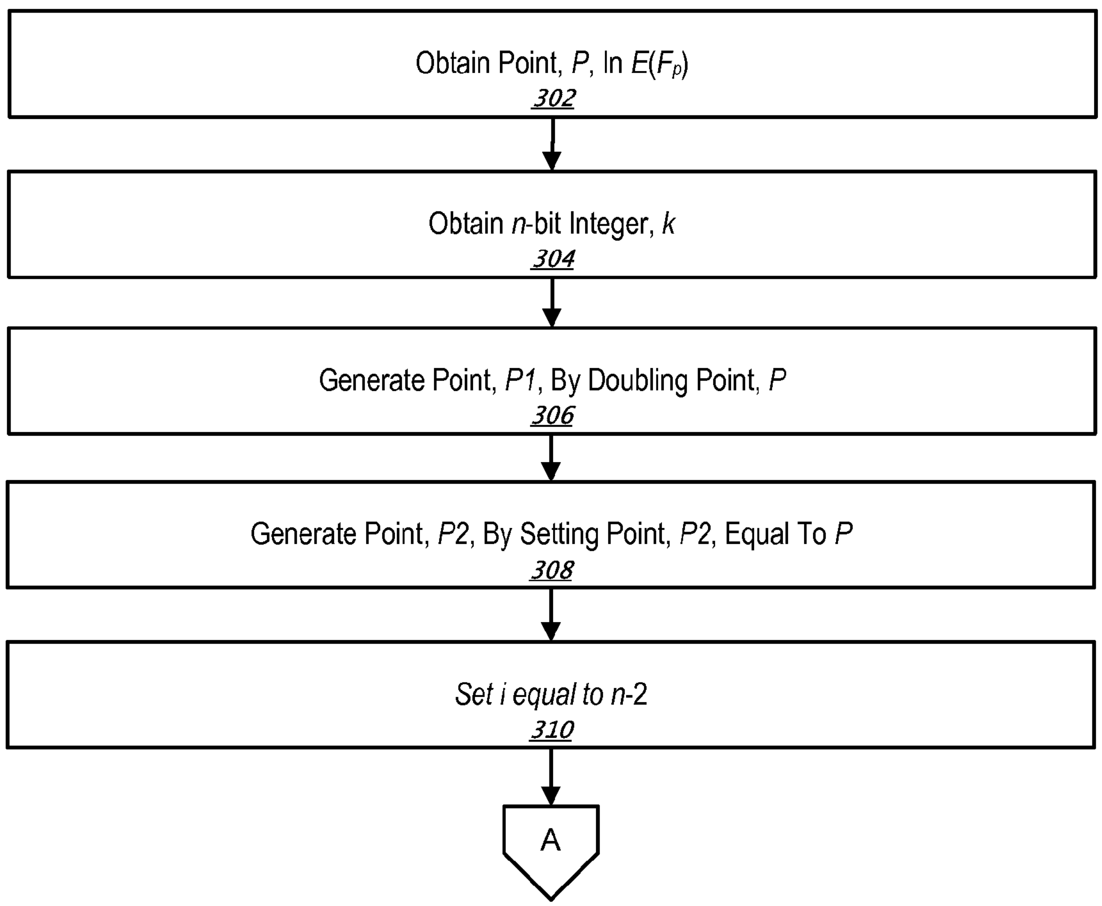
FIGS. 3A and 3B are a flow diagram of an example point multiplication process that uses a point scalar multiplication operation.
Figure 3B:
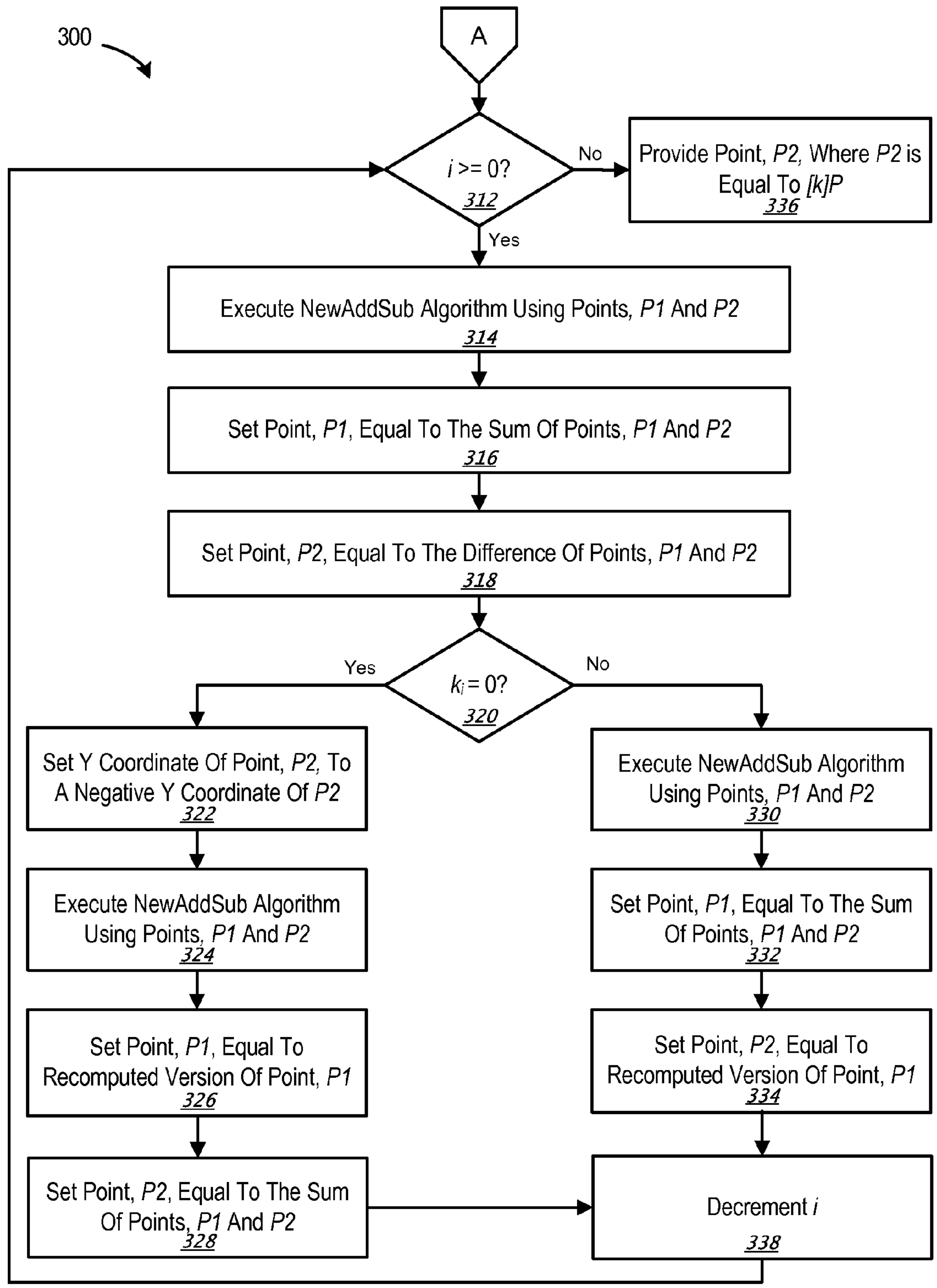

Point Multiplication Process Using A FullMult Point Scalar Multiplication Operation FIGS. 3A and 3B are a flow diagram of an example point multiplication process 300 that uses a FullMult point scalar multiplication operation. The process 300 can perform the point scalar multiplication, $P_2$=k.P. As shown in FIG. 3A, the process 300 begins by obtaining a point, P, which is an element of an elliptic curve in a prime field, E(Fp) (step 302). An n-bit integer, k, is obtained (step 304), where the integer, k, is of the order, n, where $k=(k_{n-1} \ldots k_1 k_0)_2$. A point, P1, is generated by doubling the input point, P (step 306). A point, P2, is generated by setting P2 equal to the input point, P (step 308). At this step in the process 300, the z-coordinate of the point, P2, is equal to the z-coordinate of the point P1.

Next in the process 300, an integer, i, is set equal to n−2 (step 310). As shown in FIG. 3B, if i is greater than or equal to zero (step 312), the process 300 continues by executing a NewAddSub operation using points P1 and P2 (step 314). Point, P1, is set equal to the sum of points P1 and P2 (where P1+P2 is one of the plurality of results generated by the execution of the NewAddSub Operation in step 314) (step 316). Point, P2, is set equal to the difference of the points P1 and P2 (where P1−P2 is one of the plurality of results generated by the execution of the NewAddSub Operation in step 314) (step 318).

Next in the process 300, the $i^{th}$ bit of the binary form of the integer, k, ($k_i$) is checked to see if it is equal to zero (step 320). If $k_i$ is not equal to zero, the process 300 continues by executing a NewAddSub operation using points P1 and P2 (step 330). Point, P1, is set equal to the sum of points P1 and P2 (where P1+P2 is one of the plurality of results generated by the execution of the NewAddSub Operation in step 330) (step 332). Point, P2, is set equal to a recomputed version of the point, P1, with an appropriate z-coordinate (where $\tilde{P}_1$ is one of the plurality of results generated by the execution of the NewAddSub Operation in step 330) (step 334). The process 300 continues by decrementing the integer, i (step 338). The process continues to step 312 to check the value of i.

If, in step 320, the $i^{th}$ bit of the binary form of the integer, k, ($k_i$) is equal to zero, the process 300 continues to step 322 where the y-coordinate of the point, P2, (y2) is set equal to the negative of the y-coordinate of the point, P2 (−y2). A NewAddSub operation using the points, P1 and P2, is executed (step 324). Point, P1, is set equal to a recomputed version of the point, P1, with an appropriate z-coordinate (where $\tilde{P}_1$ is one of the plurality of results generated by the execution of the NewAddSub Operation in step 324) (step 326). Point, P2, is set equal to the sum of the points, P1 and P2 (where P1+P2 is one of the plurality of results generated by the execution of the NewAddSub Operation in step 324) (step 328). The process 300 continues by decrementing the integer, i (step 338). The process continues to step 312 to check the value of i.

If, in step 312, the value of the integer, i, is less than zero, point, P2, is provided as an output, where the point, P2, is the result of the point scalar multiplication of k.P (P2=[k]P) (step 336). The process 300 ends.

In some implementations, the process 300 can be modified to replace the NewAddSub operation executed in steps 324 and 330 with a NewAdd operation, using the modified FullMult operation. This can reduce the execution time of the process 300, making it more efficient.

Figure 4A:
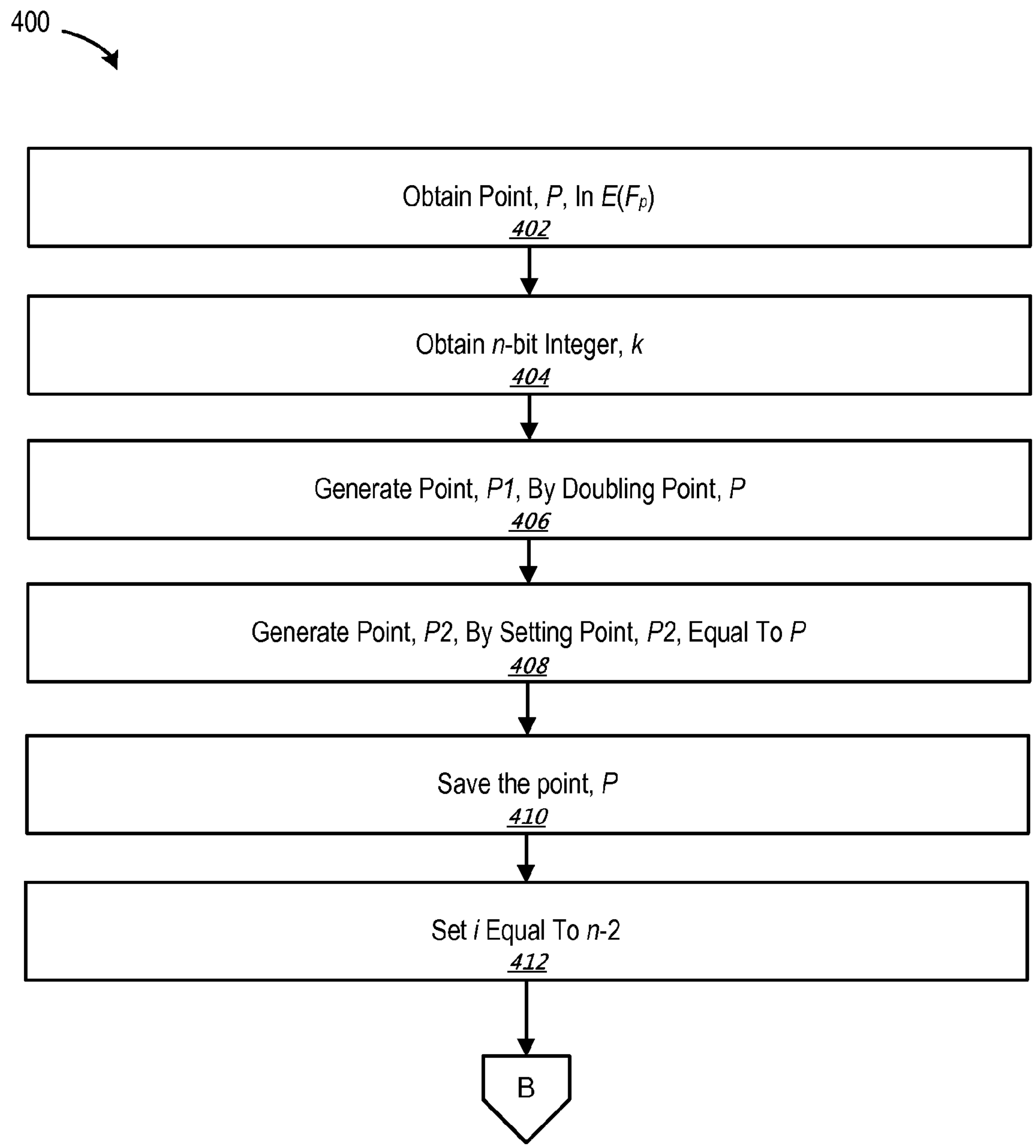
FIGS. 4A, 4B, 4C, and 4D are a flow diagram of an example point multiplication process that uses an alternate point scalar multiplication operation.

Point Multiplication Process Using A LightMult Point Scalar Multiplication Operation FIGS. 4A, 4B, 4C, and 4D are a flow diagram of an example point multiplication process 400 that uses a LightMult point scalar multiplication operation. The process 400 can perform the point scalar multiplication, $P_2$=k.P. As shown in FIG. 4A, the process 400 begins by obtaining a point, P, which is an element of an elliptic curve in a prime field, E(Fp) (step 402). An n-bit integer, k, is obtained (step 404), where the integer, k, is of the order, n, where $k=(k_{n-1} \ldots k_1 k_0)_2$. A point, P1, is generated by doubling the input point, P (step 406). A point, P2, is generated by setting P2 equal to the input point, P (step 408). At this step in the process 400, the z-coordinate of the point, P2, is equal to the z-coordinate of the point P1. The point, P1, is saved (as point Psave) (step 412).

Figure 4B:
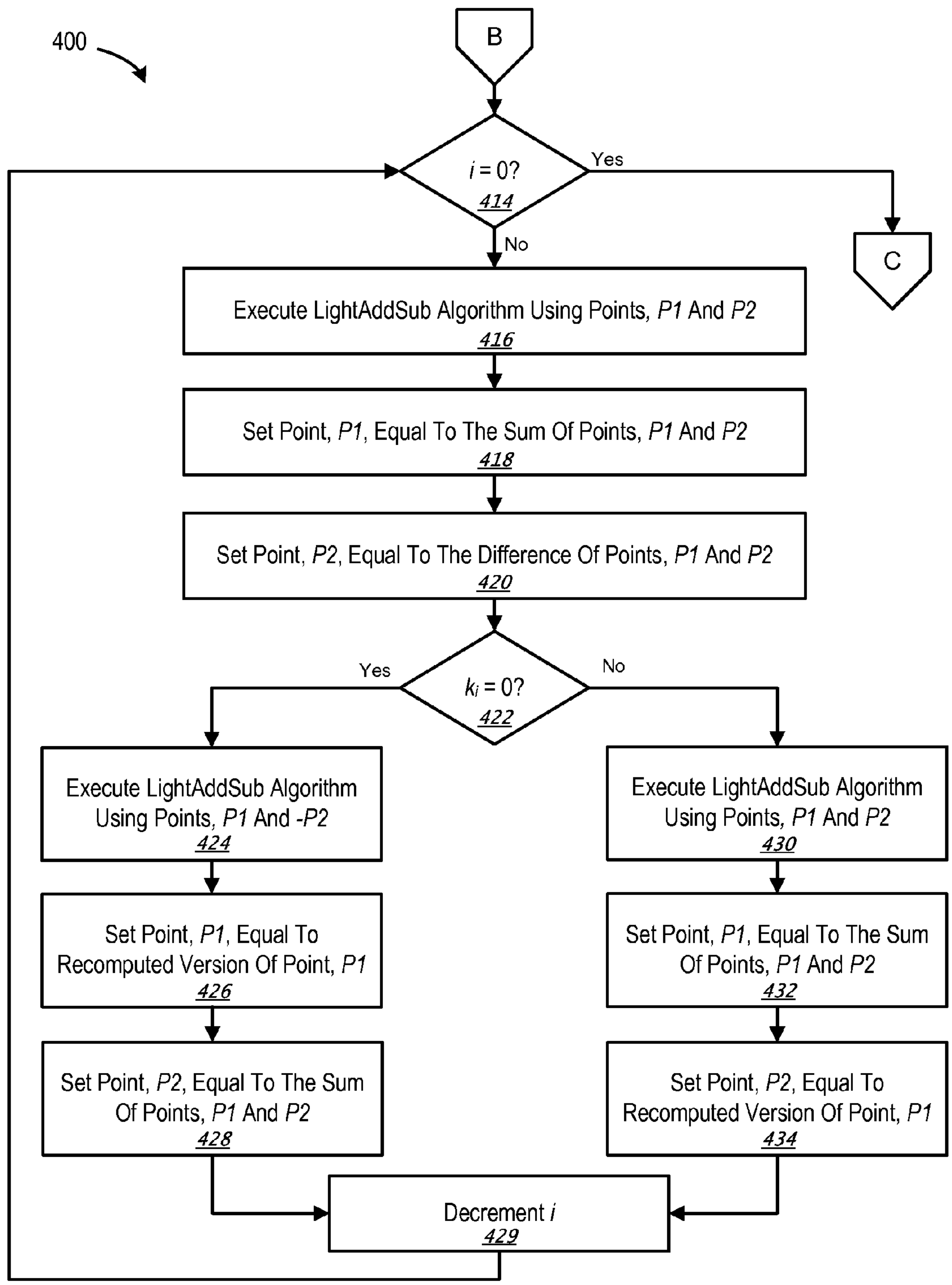

Next in the process 400, an integer, i, is set equal to n−2 (step 412). As shown in FIG. 4B, if i is not equal to zero (step 414), the process 400 continues by executing a LightAddSub operation using points P1 and P2 (step 416). Point, P1, is set equal to the sum of points P1 and P2 (where P1+P2 is one of the plurality of results generated by the execution of the LightAddSub Operation in step 416) (step 418). Point, P2, is set equal to the difference of the points P1 and P2 (where P1−P2 is one of the plurality of results generated by the execution of the NewAddSub Operation in step 416) (step 420).

Next in the process 400, the $i^{th}$ bit of the binary form of the integer, k, ($k_i$) is checked to see if it is equal to zero (step 422). If $k_i$ is not equal to zero, the process 400 continues by executing a LightAddSub operation using points P1 and P2 (step 430). Point, P1, is set equal to the sum of points P1 and P2 (where P1+P2 is one of the plurality of results generated by the execution of the NewAddSub Operation in step 430) (step 432). Point, P2, is set equal to a recomputed version of the point, P1, with an appropriate z-coordinate (where $\tilde{P}_1$ is one of the plurality of results generated by the execution of the NewAddSub Operation in step 430) (step 434). The process 400 continues by decrementing the integer, i (step 429). The process continues to step 414 to check the value of i.

If, in step 422, the $i^{th}$ bit of the binary form of the integer, k, ($k_i$) is equal to zero, the process 400 continues to step 424 where a LightAddSub operation using the points, P1 and −P2, is executed (step 424). Point, P1, is set equal to a recomputed version of the point, P1, with an appropriate z-coordinate (where $\tilde{P}_1$ is one of the plurality of results generated by the execution of the NewAddSub Operation in step 424) (step 426). Point, P2, is set equal to the sum of the points, P1 and P2 (where P1+P2 is one of the plurality of results generated by the execution of the NewAddSub Operation in step 424) (step 428). The process 400 continues by decrementing the integer, i (step 429). The process continues to step 414 to check the value of i.

Figure 4C:
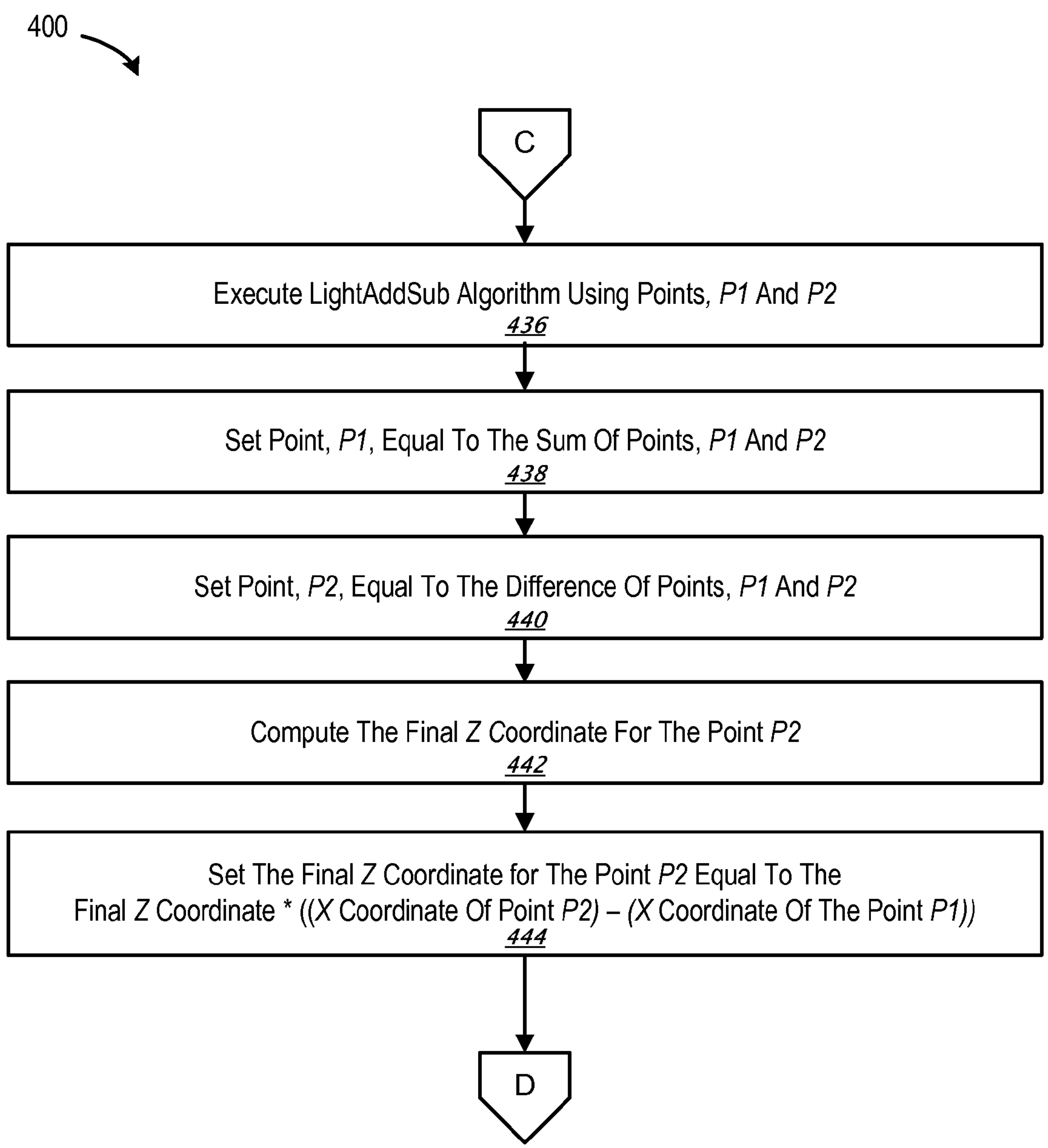

If, in step 414, the value of the integer, i, equals zero, as shown in FIG. 4C, the last round of the point scalar multiplication is performed, calculating the z-coordinate of the output point, P2. As shown in FIG. 4C, the process 400 executes a LightAddSub operation using the points, P1 and P2 (step 436). Point, P1, is set equal to the sum of points P1 and P2 (where P1+P2 is one of the plurality of results generated by the execution of the NewAddSub Operation in step 436) (step 438). Point, P2, is set equal to the difference of points P1 and P2 (where P1−P2 is one of the plurality of results generated by the execution of the NewAddSub Operation in step 436) (step 440). The final z-coordinate is calculated for the point, P2 (step 442). Next in the process 400, the final z-coordinate for point, P2, is set equal to the final z-coordinate calculated in step 442 multiplied by the difference between the x-coordinate of point, P2, and the x-coordinate of point, P1 (step 444).

Figure 4D:
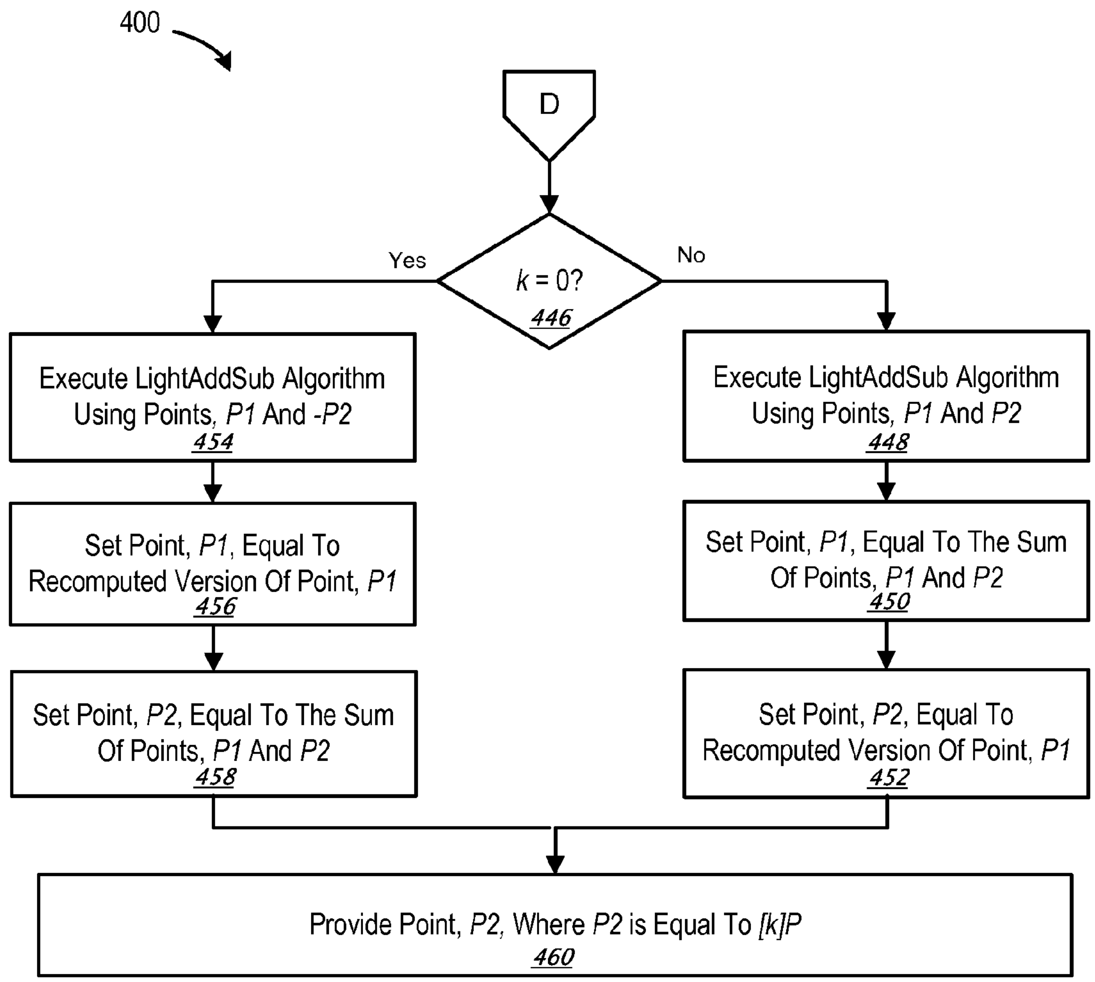

As shown in FIG. 4D, the process 400 continues by checking if the $i^{th}$ bit of the binary form of the integer, k, ($k_i$) is equal to zero (step 446). If $k_i$ is not equal to zero, the process 400 continues to step 448 where a LightAddSub operation using the points, P1 and P2, is executed. Point, P1, is set equal to the sum of points P1 and P2 (where P1+P2 is one of the plurality of results generated by the execution of the NewAddSub Operation in step 448) (step 450). Point, P2, is set equal to a recomputed version of the point, P1, with an appropriate z-coordinate (where $\tilde{P}_1$ is one of the plurality of results generated by the execution of the NewAddSub Operation in step 448) (step 452). The process 400 continues, providing the output point, P2, where the point, P2, is the result of the point scalar multiplication process of k.P (P2=[k]P) (step 460). The process 400 ends.

If, in step 446, the $i^{th}$ bit of the binary form of the integer, k, ($k_i$) is equal to zero, the process 400 continues to step 454 where a LightAddSub operation using the points, P1 and −P2, is executed (step 454). Point, P1, is set equal to a recomputed version of the point, P1, with an appropriate z-coordinate (where $\tilde{P}_1$ is one of the plurality of results generated by the execution of the NewAddSub Operation in step 454) (step 456). Point, P2, is set equal to the sum of the points, P1 and P2 (where P1+P2 is one of the plurality of results generated by the execution of the NewAddSub Operation in step 454) (step 458). The process 400 continues, providing the output point, P2, where the point, P2, is the result of the point scalar multiplication process of k.P (P2=[k]P) (step 460). The process 400 ends.

In some implementations, the process 400 can be modified to replace the LightAddSub operation executed in steps 424, 430, 448 and 454 with a LightAdd operation, using the modified LightMult operation. This can reduce the execution time of the process 400, making it more efficient.

System Architecture

Figure 5:
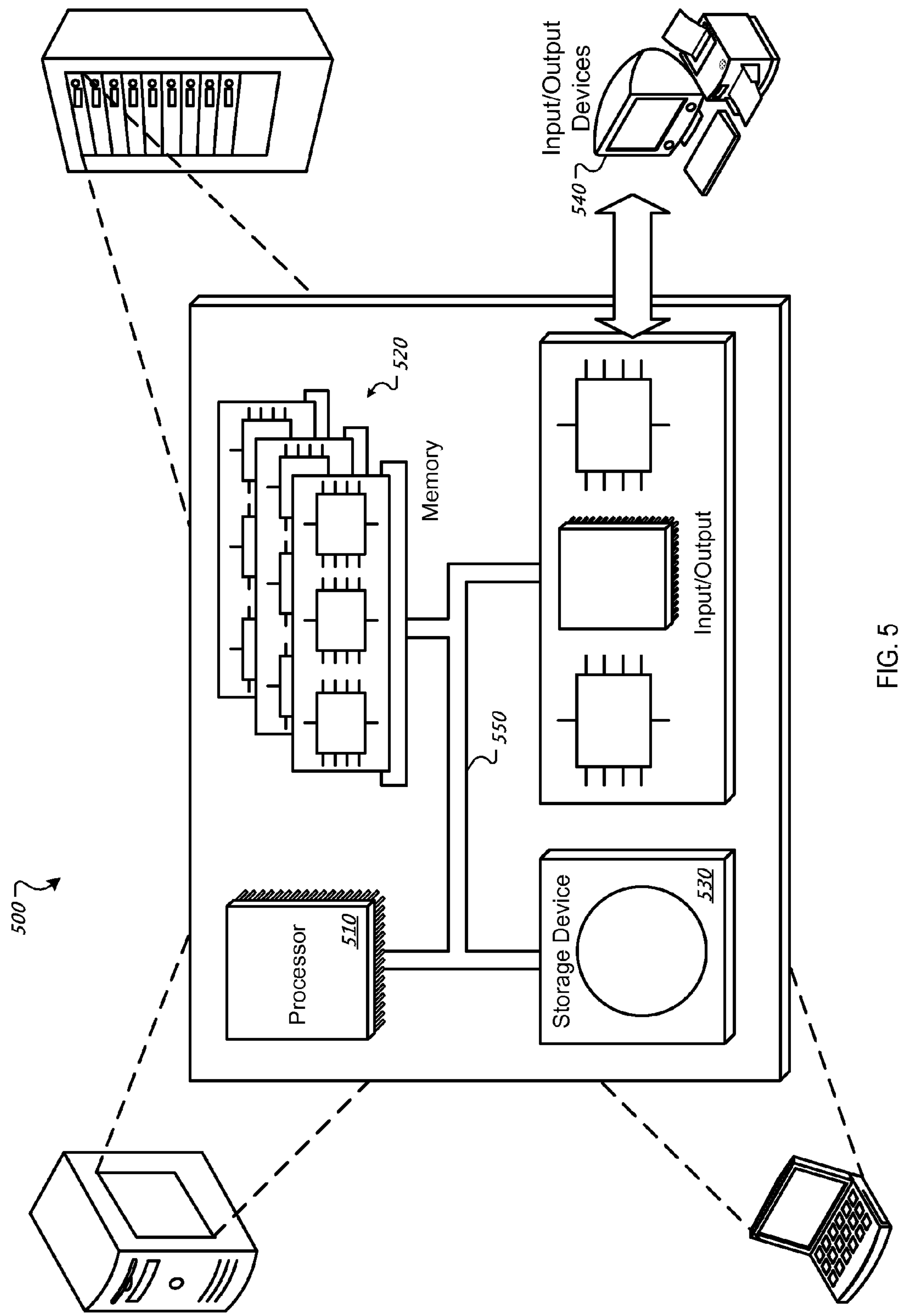
FIG. 5 is a block diagram of an implementation of a system for implementing the processes of FIGS. 2, 3A-B, and 4A-D.

FIG. 5 is a block diagram of an example implementation of a system for implementing the processes of FIGS. 2, 3A-B, and 4A-D. For example, the system 500 can be included in device 102 and/or in device 104, described in reference to FIG. 1. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In other implementations, the memory 520 is a volatile memory unit. In yet other implementations, the memory 520 is a non-volatile memory unit.

The storage device 530 is capable of providing mass storage for the system 500. In some implementations, the storage device 530 is a computer-readable medium. In various different implementations, the storage device 530 can be a floppy disk device, a hard disk device, an optical disk device, or a tape device.

The input/output device 540 provides input/output operations for the system 500. In some implementations, the input/output device 540 includes a keyboard and/or pointing device. In other implementations, the input/output device 540 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made. For example, elements of one or more implementations can be combined, deleted, modified, or supplemented to form further implementations. Logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

APPENDIX A

```
NewAddSub Operation:
    /* compute the final value of z * /
    R_1 ← x_2 − x_1;
    z ← z * R_1;
    /* compute x_{P̂1} = x_1 * /
    R_1 ← R_1^2;
    x_1 ← x_1 * R_1;
    /* compute x_{P1+P2} = R_2 * /
    x_2 ← x_2 * R_1;
    R_1 ← y_2 − y_1;
    R_2 ← R_1^2;
    R_2 ← R_2 − x_1 − x_2;
    /* compute x_{P1−P2} = R_4 * /
    R_3 ← x_1 − R_2;
    R_3 ← R_1 * R_3;
    y_2 ← − y_2 − y_1;
    R_4 ← y_2^2;
    R_4 ← R_4 − x_1 − x_2;
    /* compute y_{P̂1} = R_1 * /
    x_2 ← x_2 − x_1;
    R_1 ← y_1 * x_2;
    /* compute y_{P1+P2} = x_2 * /
    x_2 ← R_3 − R_1;
    /* compute y_{P1−P2} = y_2 * /
    y_1 ← x_1 − R_4;
    y_1 ← y_1 * y_2;
    y_2 ← y_1 − R_1;
    return P̂_1 =(x_1,R_1,z), P_1 + P_2 =(R_2,x_2,z), P_1 − P_2 =(R_4,y_2,z)
FullMult Operation:
    A ← 2.P;
    B ← P;
    // note:z_A=z_B
    for i ← n−2 to 0 do
        T ← NewAddSub(A,B);
        /* A ← (A + B) */
        A ← T[1]
        /* B ← (A − B)=P */
        B ← T[2]
        if k_i=0 then
            /* B ← −B=−P */
            y_B=−y_B
            T ← NewAddSub(A,B);
            /* A ← Ã */
            A ← T[0]
            /* B ← (A + B) */
            B ← T[1]
        else
            T ← NewAddSub(A,B);
            /* A ← (A + B) */
            A ← T[1]
            /* B ← Ã */
            B ← T[0]
    return B
Modified FullMult Operation:
    A ← 2.P;
    B ← P;
    // note:z_A=z_B
    for i ← n−2 to 0 do
        T ← NewAddSub(A,B);
        /* A ← (A + B) */
        A ← T[1]
        /* B ← (A − B)=P */
        B ← T[2]
        if k_i=0 then
            /* B ← −B=−P */
            y_B=−y_B
            T ← NewAdd(A,B);
            /* A ← Ã */
            A ← T[0]
            /* B ← (A + B) */
            B ← T[1]
        else
            T ← NewAdd(A,B);
            /* A ← (A + B) */
            A ← T[1]
```

APPENDIX A-continued

```
            /* B ← Ã */
            B ← T[0]
    return B
LightAddSub Operation:
    /* compute x_{P̂1} = x_1 * /
    R_1 ← x_2 − x_1;
    R_1 ← R_1^2;
    x_1 ← x_1 * R_1;
    /* compute x_{P1+P2} = R_2 * /
    x_2 ← x_2 * R_1;
    R_1 ← y_2 − y_1;
    R_2 ← R_1^2;
    R_2 ← R_2 − x_1 − x_2;
    /* compute x_{P1−P2} = R_4 * /
    R_3 ← x_1 − R_2;
    R_3 ← R_1 * R_3;
    y_2 ← − y_2 − y_1;
    R_4 ← y_2^2;
    R_4 ← R_4 − x_1 − x_2;
    /* compute y_{P̂1} = R_1 * /
    x_2 ← x_2 − x_1;
    R_1 ← y_1 * x_2;
    /* compute y_{P1+P2} = x_2 * /
    x_2 ← R_3 − R_1;
    /* compute y_{P1−P2} = y_2 * /
    y_1 ← x_1 − R_4;
    y_1 ← y_1 * y_2;
    y_2 ← y_1 − R_1;
    return P̂_1 =(x_1,R_1,z), P_1 + P_2 =(R_2,x_2,z), P_1 − P_2 =(R_4,y_2,z)
LightMult Operation:
    A ← 2.P;
    B ← P;
    // note:z_A=z_B
    P_save ← P;
    for i ← n−2 to 1 do
        T ← LightAddSub(A,B);
        /* A ← (A + B) */
        A ← T[1]
        /* B ← (A − B)=P */
        B ← T[2]
        if k_i=0 then
            T ← LightAddSub(A,−B);
            /* A ← Ã */
            A ← T[0]
            /* B ← (A + B) */
            B ← T[1]
        else
            T ← LightAddSub(A,B);
            /* A ← (A + B) */
            A ← T[1]
            /* B ← Ã */
            B ← T[0]
    // compute the last round
    T ← LightAddSub(A,B);
    /* A ← (A + B) */
    A ← T[1]
    /* B ← (A − B)=P */
    B ← T[2]
    // compute the value of z_P
    z_final ← x_B*y_{P_save};
    z_final ← (z_final)^−1;
    z_final ← z_final*y_B;
    z_final ← z_final*x_{P_save};
    z_final ← z_final*z_{P_save};
    if k_i=0 then
        z_final ← (z_final*(x_B−x_A));
        T ← LightAddSub(A,−B);
        /* A ← Ã */
        A ← T[0]
        /* B ← (A + B) */
        B ← T[1]
    else
        z_final ← (z_final*(x_B−x_A));
        T ← LightAddSub(A,B);
        /* A ← (A + B) */
        A ← T[1]
        /* B ← Ã */
        B ← T[0]
```

APPENDIX A-continued

```
    B ← [x_B,y_B,z_final];
    return B
Modified LightMult Operation:
    A ← 2.P;
    B ← P;
    // note:z_A=z_B
    P_save ← P;
    for i ← n−2 to 1 do
        T ← LightAddSub(A,B);
        /* A ← (A + B) */
        A ← T[1]
        /* B ← (A − B)=P */
        B ← T[2]
        if k_i=0 then
            T ← LightAdd(A,−B);
            /* A ← Ã */
            A ← T[0]
            /* B ← (A + B) */
            B ← T[1]
        else
            T ← LightAdd(A,B);
            /* A ← (A + B) */
            A ← T[1]
            /* B ← Ã */
            B ← T[0]
    // compute the last round
    T ← LightAddSub(A,B);
    /* A ← (A + B) */
    A ← T[1]
    /* B ← (A − B)=P */
    B ← T[2]
    // compute the value of z_P
    z_final ← x_B*y_Psave;
    z_final ← (z_final)^−1;
    z_final ← z_final*y_B;
    z_final ← z_final*x_Psave;
    z_final ← z_final*z_Psave;
    if k_i=0 then
        z_final ← (z_final*(x_B−x_A));
        T ← LightAdd(A,−B);
        /* A ← Ã */
        A ← T[0]
        /* B ← (A + B) */
        B ← T[1]
    else
        z_final ← (z_final*(x_B−x_A));
        T ← LightAdd(A,B);
        /* A ← (A + B) */
        A ← T[1]
        /* B ← Ã */
        B ← T[0]
    B ← [x_B,y_B,z_final];
    return B
```

What is claimed is:

1. An elliptic curve cryptographic method performed by a device adapted to perform cryptographic operations, the method comprising:

obtaining a point P on an elliptic curve, the point P representing material to be encrypted, the point P defined in a three-dimensional projective coordinate system by x, y, z reference coordinates, the direction of the z reference coordinate in the coordinate system determined by the cross product of the x and y reference coordinates;

obtaining an n-bit integer k;

computing points P1, P2 on the elliptic curve as a function of P;

performing a scalar multiplication operation using P1, P2, k and n, where during the scalar multiplication operation the point P is recomputed as a function of points P1 and P2, the re-computing including addition and subtraction operations on points P1 and P2, the re-computing resulting in the value of the z coordinate of P1 being equal to the value of the z coordinate of P2; and providing encrypted material [k]P resulting from the scalar multiplication operation.

2. The method of claim 1, where the coordinate system is a Jacobian coordinate system.

3. The method of claim 1, where the elliptic curve is a Montgomery elliptic curve.

4. The method of claim 1 , where the addition is Meloni addition.

5. An elliptic curve cryptographic method performed by a device adapted to perform cryptographic operations, the method comprising:

obtaining a point P on an elliptic curve, the point P representing material to be encrypted, the point P defined in a three-dimensional coordinate system by x, y, z reference coordinates, the direction of the z reference coordinate in the coordinate system determined by the cross product of the x and y reference coordinates;

obtaining an n-bit integer k;

generating a point P1 by doubling point P;

generating a point P2 by setting P2 equal to P, resulting in the value of the z coordinate of P1 being equal to the value of the z coordinate of P2;

setting point P1 equal to the sum of points P1 and P2;

setting point P2 equal to the difference of points P1 and P2;

determining if k is equal to zero;

if k is equal to zero, setting the y coordinate of point P2 to a negative y coordinate of point P2;

recomputing point P1 to be equal to a recomputed version of point P1 with an appropriate z-coordinate;

recomputing point P2 to be equal to the sum of points P1 and P2;

if k is not equal to zero, recomputing point P1 to be equal to the sum of points P1 and P2;

recomputing point P2 to be equal to a recomputed version of point P1 with an appropriate z-coordinate; and providing point P2, where P2 is equal to [k]P.

6. The method of claim 5, where the coordinate system is a Jacobian coordinate system.

7. The method of claim 5, where the elliptic curve is a Montgomery elliptic curve.

8. The method of claim 5, where the sum of points is performed using Meloni addition.

9. An elliptic curve cryptographic method performed by a device adapted to perform cryptographic operations, the method comprising:

obtaining a point P on an elliptic curve, the point P representing material to be encrypted, the point P defined in a three-dimensional coordinate system by x, y, z reference coordinates, the direction of the z reference coordinate in the coordinate system determined by the cross product of the x and y reference coordinates;

obtaining an n-bit integer k;

generating a point P1 by doubling point P;

generating a point P2 by setting P2 equal to P, resulting in the value of the z coordinate of P1 being equal to the value of the z coordinate of P2;

generating a point Psave by setting Psave equal to point P;

determining if n is equal to zero;

if n is not equal to zero;

setting point P1 equal to the sum of points P1 and P2;

setting point P2 equal to the difference of points P1 and P2;

determining if k is equal to zero;

if k is equal to zero, recomputing point P1 to be equal to a recomputed version of point P1 with an appropriate z-coordinate;

recomputing point P2 to be equal to the sum of points P1 and a negative of point P2;

if k is not equal to zero, recomputing point P1 to be equal to the sum of points P1 and P2;

recomputing point P2 to be equal to a recomputed version of point P1 with an appropriate z-coordinate;

if n is equal to zero, recomputing point P1 to be equal to the sum of points P1 and P2;

recomputing point P2 to be equal to the difference of points P1 and P2;

recomputing the z coordinate of point P2 using the x, y, and z coordinates of point Psave and the x and y coordinates of point P2;

recomputing the z coordinate of point P2 to be equal to the difference between the x coordinate of point P2 and the x coordinate of point P1 multiplied by the z coordinate of point P2;

determining if k is equal to zero;

if k is equal to zero, recomputing point P1 to be equal to a recomputed version of point P1 with an appropriate z-coordinate;

recomputing point P2 to be equal to the sum of points P1 and P2;

if k is not equal to zero, recomputing point P1 to be equal to the sum of points P1 and P2;

recomputing point P2 to be equal a recomputed version of point P1 with an appropriate z-coordinate; and providing point P2, where P2 is equal to P.

10. The method of claim 9, where the coordinate system is a Jacobian coordinate system.

11. The method of claim 9, where the elliptic curve is a Montgomery elliptic curve.

12. The method of claim 9, where the sum of points is performed using Meloni addition.

13. An elliptic curve cryptosystem, comprising:

an interface operable for receiving a point P on an elliptic curve, the point P representing material to be encrypted, the point P defined in a three-dimensional coordinate system by x, y, z reference coordinates, the direction of the z reference coordinate in the coordinate system determined by the cross product of the x and y reference coordinates, the interface further operable for receiving an n-bit integer k; and a computer processor coupled to the interface, the processor operable for:

computing points P1, P2 on the elliptic curve as a function of P;

performing a scalar multiplication operation using P1, P2, k and n, where during the scalar multiplication operation the point P is recomputed as a function of points P1 and P2, the re-computing including addition and subtraction operations on points P1 and P2, the re-computing resulting in the value of the z coordinate of P1 being equal to the value of the z coordinate of P2; and providing encrypted material [k]P resulting from the scalar multiplication operation through the interface, where [k]P is encrypted material.

14. The system of claim 13, where the coordinate system is a Jacobian coordinate system.

15. The system of claim 13, where the elliptic curve is a Montgomery elliptic curve.

16. The system of claim 13, where the addition is Meloni addition.

17. An elliptic curve cryptosystem, comprising:

an interface operable for receiving a point P on an elliptic curve, the point P representing material to be encrypted, the point P defined in a three-dimensional coordinate system by x, y, z reference coordinates, the direction of the z reference coordinate in the coordinate system determined by the cross product of the x and y reference coordinates, the interface further operable for receiving an n-bit integer k; and a computer processor coupled to the interface and operable for:

generating a point P1 by doubling point P;

generating a point P2 by setting P2 equal to P, resulting in the value of the z coordinate of P1 being equal to the value of the z coordinate of P2;

setting point P1 equal to the sum of points P1 and P2;

setting point P2 equal to the difference of points P1 and P2;

determining if k is equal to zero;

if k is equal to zero, setting the y coordinate of point P2 to a negative y coordinate of point P2;

recomputing point P1 to be equal to a recomputed version of point P1 with an appropriate z-coordinate;

recomputing point P2 to be equal to the sum of points P1 and P2;

if k is not equal to zero, recomputing point P1 to be equal to the sum of points P1 and P2;

recomputing point P2 to be equal to a recomputed version of point P1 with an appropriate z-coordinate; and making point P2 available through the interface, where P2 is equal to [k]P, and [k]P is encrypted material.

18. The system of claim 17, where the coordinate system is a Jacobian coordinate system.

19. The system of claim 17, where the elliptic curve is a Montgomery elliptic curve.

20. The system of claim 17, where the sum of points is performed using Meloni addition.

21. An elliptic curve cryptosystem, comprising:

an interface operable for receiving a point P on an elliptic curve, the point P representing material to be encrypted, the point P defined in a three-dimensional coordinate system by x, y, z reference coordinates, the direction of the z reference coordinate in the coordinate system determined by the cross product of the x and y reference coordinates, the interface further operable for receiving an n-bit integer k; and a computer processor coupled to the interface and operable for:

generating a point P1 by doubling point P;

generating a point P2 by setting P2 equal to P, resulting in the value of the z coordinate of P1 being equal to the value of the z coordinate of P2;

generating a point Psave by setting Psave equal to point P;

determining if n is equal to zero;

if n is not equal to zero;

setting point P1 equal to the sum of points P1 and P2;

setting point P2 equal to the difference of points P1 and P2;

determining if k is equal to zero;

if k is equal to zero, recomputing point P1 to be equal to a recomputed version of point P1 with an appropriate z-coordinate;

recomputing point P2 to be equal to the sum of points P1 and a negative of point P2;

if k is not equal to zero, recomputing point P1 to be equal to the sum of points P1 and P2;

recomputing point P2 to be equal to a recomputed version of point P1 with an appropriate z-coordinate;

if n is equal to zero, recomputing point P1 to be equal to the sum of points P1 and P2;

recomputing point P2 to be equal to the difference of point P1 and P2;

recomputing the z coordinate of point P2 using the x,y, and z coordinates of point Psave and the x and y coordinates of point P2;

determining if k is equal to zero;

recomputing the z coordinate of point P2 to be equal to the difference between the x coordinate of point P2 and the x coordinate of point P1 multiplied by the z coordinate of point P2;

if k is equal to zero, recomputing point P1 to be equal to a recomputed version of point P1 with an appropriate z-coordinate;

recomputing point P2 to be equal to the sum of points P1 and P2;

if k is not equal to zero, recomputing point P1 to be equal to the sum of points P1 and P2;

recomputing point P2 to be equal to a recomputed version of point P1 with an appropriate z-coordinate; and providing point P2, where P2 is equal to P.

22. The system of claim 21, where the coordinate system is a Jacobian coordinate system.

23. The system of claim 21, where the elliptic curve is a Montgomery elliptic curve.

24. The system of claim 21, where the sum of points is performed using Meloni addition.

* * * * *